United States Patent
Trim et al.

(10) Patent No.: US 11,114,104 B2
(45) Date of Patent: Sep. 7, 2021

(54) PREVENTING ADVERSARIAL AUDIO ATTACKS ON DIGITAL ASSISTANTS

(71) Applicant: International Business Machines Corporation, Armonk, NY (US)

(72) Inventors: Craig M. Trim, Ventura, CA (US); Michael Bender, Rye Brook, NY (US); Zachary A. Silverstein, Austin, TX (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 16/444,424

(22) Filed: Jun. 18, 2019

(65) Prior Publication Data

US 2020/0402516 A1 Dec. 24, 2020

(51) Int. Cl.
| | | |
|---|---|---|
| *G10L 25/78* | (2013.01) | |
| *G10L 17/22* | (2013.01) | |
| *H04L 29/08* | (2006.01) | |
| *G10L 25/51* | (2013.01) | |

(52) U.S. Cl.
CPC .............. *G10L 17/22* (2013.01); *G10L 25/51* (2013.01); *H04L 67/12* (2013.01)

(58) Field of Classification Search
CPC ......... G10L 25/78; G10L 15/22; G10L 17/22; G06F 3/167
See application file for complete search history.

(56) References Cited

U.S. PATENT DOCUMENTS

| | | | |
|---|---|---|---|
| 8,644,506 | B2 | 2/2014 | Zellner |
| 9,589,147 | B2 | 3/2017 | Hanner, Sr. et al. |
| 9,749,583 | B1* | 8/2017 | Fineberg ............... G10L 15/22 |
| 2008/0162679 | A1 | 7/2008 | Maher |
| 2009/0225697 | A1 | 9/2009 | Solomon |
| 2012/0237908 | A1 | 9/2012 | Fitzgerald et al. |
| 2014/0222436 | A1 | 8/2014 | Binder |
| 2015/0340040 | A1* | 11/2015 | Mun ...................... G10L 25/78 |
| | | | 704/246 |

(Continued)

OTHER PUBLICATIONS

Wang et al, "Hybrid Cooperative Beamforming and Jamming for Physical-Layer Security of Two-way Relay Networks." IEEE Transactions on Information Forensics and Security 8.12 (Dec. 2013), 14 pps.

(Continued)

*Primary Examiner* — Daniel Abebe
(74) *Attorney, Agent, or Firm* — Marcus Walker

(57) ABSTRACT

Aspects of the present invention disclose a method for preventing adversarial audio attacks through detecting and isolating inconsistencies utilizing beamforming techniques and IoT devices. The method includes one or more processors identifying an audio command received by a listening device. The method further includes determining a source location of the audio command utilizing a sensor array of the listening device. The method further includes determining a location of a user in relation to the listening device based on data of an Internet of Things (IoT) device. The method further includes determining an inconsistency between the determines source location and the determined location of the user based at least in part on data of the sensor array and data of the IoT device.

20 Claims, 3 Drawing Sheets

(56) References Cited

U.S. PATENT DOCUMENTS

2016/0019026 A1* 1/2016 Gupta ................. G10L 21/0272
                                                                              704/233
2018/0063091 A1 3/2018 Lancioni et al.
2020/0072937 A1* 3/2020 Baek ....................... G06F 3/167

OTHER PUBLICATIONS

"Audio Adversarial Examples", 3 pps., printed from the Internet on Apr. 8, 2019, <https://nicholas.carlini.com/code/audio_adversarial_examples/>.

Waring, "Number of devices to hit 4.3 per person by 2020—report", World Live, 7 pps., Oct. 16, 2014, <https://www.mobileworldlive.com/featured-content/home-banner/connected-devices-to-hit-4-3-per-person-by-2020-report/>.

Alzomai et al., "Display Integrity Assurance for SMS Transaction Authorization", International Journal for Information Security Research (IJISR), vol. 1, Issue 4, (Dec. 2011), 10 pps.

Benice et al., "Hackers Are Targeting Your Mobile Phone. Here Are 15 Ways to Slow Them Down", Security & Privacy, Nov. 30, 2017, 6 pps., <https://hbr.org/2017/11/hackers-are-targeting-your-mobile-phone-here-are-15-ways-to-slow-them-down>.

Bouche et al., "On the Performance of Anomaly Detection Systems Uncovering Traffic Mimicking Covert Channels." Inc. 2016, 6 pps., Proceedings of the Eleventh International Network Conference (INC 2016).

Norris, et al., "How much digital data does an average digital user generate per day and per year?", Quora.com, Answered Nov. 9, 2016, 3 pps., <https://www.quora.com/How-much-digital-data-does-an-average-digital-user-generate-per-day-and-per-year>.

Tannam, "Hearing voices: Researchers show how Siri and Alexa could be manipulated", Silicon Republic, May 11, 2018, 30 pps., <https://www.siliconrepublic.com/enterprise/alexa-siri-hidden-voice>.

Van Oorschot, "Message Authentication by Integrity with Public Corroboration." Proceedings of the 2005 workshop on New Security Paradigms. ACM, 2005, 7 pps.

Vincent, "Inaudible ultrasound commands can be used to secretly control Siri, Alexa, and Google Now ", The Verge, Sep. 7, 2017, 3 pps., <https://www.theverge.com/2017/9/7/16265906/ultrasound-hack-siri-alexa-google>.

* cited by examiner

PREVENTING ADVERSARIAL AUDIO ATTACKS ON DIGITAL ASSISTANTS

BACKGROUND OF THE INVENTION

The present invention relates generally to the field of mobile devices, and more particularly to preventing adversarial audio attacks on digital assistants.

In recent years, developments in digital assistants and the growth of Internet of Things (IoT) capable devices have created competition to introduce new voice interfaces (e.g., for smart speakers, virtual assistance hardware/software, etc.). The IoT is a network of physical devices embedded with electronics, software, sensors, and connectivity which enables these devices to connect and exchange data with computer-based systems. Technology is embedded in IoT-enabled devices that allow these devices to communicate, interact, be monitored, and controlled over the Internet.

Steganography is a practice of concealing information by embedding messages within other, seemingly harmless messages. This practice includes the concealment of information within computer files. In digital steganography, hidden message attacks construct a loss function based on connectionist temporal classification (CTC) loss that receives a transcription and audio file. The loss function is minimized by making slight changes to the input through gradient descent. The result is what sounds like music, white noise, or a spoken phrase to the human ear is processed with a hidden message by the digital assistant. Moreover, ultrasonic attacks utilize audio data of a command that is modulated into ultrasound, which the frequency of ultrasound is inaudible to the human ear, and modulated command is processed by the digital assistant without a user hearing the command.

Beamforming is a signal processing technique used in sensor arrays for directional signal transmission or reception. Beamforming has numerous applications in radar, sonar, and wireless communications. Adaptive beamforming is used to detect and estimate a signal of interest at the output of a sensor array.

SUMMARY

Aspects of the present invention disclose a method, computer program product, and system for preventing adversarial audio attacks through detecting and isolating inconsistencies utilizing beamforming techniques and IoT devices. The method includes one or more processors identifying an audio command received by a listening device. The method further includes one or more processors determining a source location of the audio command utilizing a sensor array of the listening device. The method further includes one or more processors determining a location of a user in relation to the listening device based on data of an Internet of Things (IoT) device. The method further includes one or more processors determining an inconsistency between the determines source location and the determined location of the user based at least in part on data of the sensor array and data of the IoT device.

DETAILED DESCRIPTION

Embodiments of the present invention allow for preventing hidden message and ultrasonic attacks through integration of beamforming and internet of things (IoT) devices to detect and isolate inconsistencies between a voice command, derived source location of the voice command, and/or data of an IoT device. Embodiments of the present invention identify a voice command and determine a position source of the voice command. Additional embodiments of the present invention retrieve data of the IoT devices and identify inconsistencies of the retrieved IoT device data and data of the identified voice command. Embodiments of the present invention determine a score, assign a confidence level, and rank the identified inconsistency. Further, embodiments of the present invention determine whether identified inconsistency is above a threshold and performs a defined action.

Some embodiments of the present invention recognize that utilizing a voice tone (e.g., recognizing the sound of voice of a user) is an ineffective security mechanism. Consequently, adversarial audio attacks on digital assistants can contain messages hidden in audio that are processed by a digital assistant without nearby human users being able to detect the command. For example, a digital assistant can be launched by the playing of audio data proximate to the digital assistant, or hidden in another asset (e.g., a song, a video playing, etc.). Various embodiments of the present invention utilize beamforming capabilities of a digital assistants integrated with the sensing capabilities of nearby IoT devices to ensure a voice command received by the digital assistant is consistent with a user issuing them to prevent an adversarial audio attack.

Embodiments of the present invention can provide an improvement of reducing the amount of processing resources a device utilizes by reducing the amount of voice commands performed by preventing the performance of illegitimate voice commands. Embodiments of the present invention also reduces the amount of memory resources a digital assistant utilizes by eliminating a need for storing voice samples of an authorized user. Further, embodiments of the present invention utilize beamforming capabilities of digital assistants interfaced with sensing capabilities of nearby IoT devices to improve validation capabilities of digital assistants.

Implementation of embodiments of the invention may take a variety of forms, and exemplary implementation details are discussed subsequently with reference to the Figures.

Figure 1:
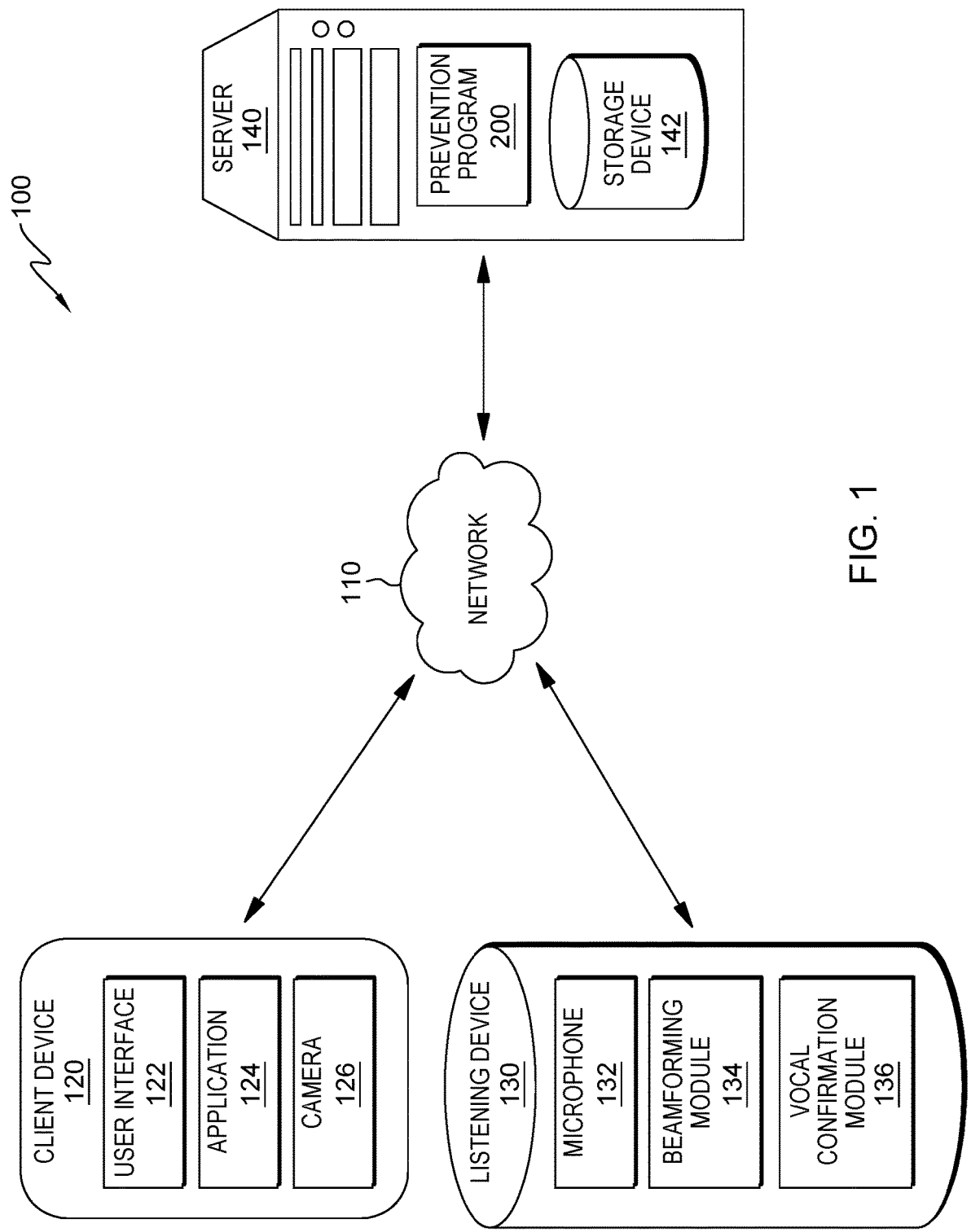
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Various embodiments of the present invention can utilize accessible sources of personal data may include personal devices (e.g., client device 120, listening device 130, etc.), social media content, and/or publicly available information. For example, embodiments of the present invention can optionally include a privacy component that enables the user to opt-in or opt-out of exposing personal information. The privacy component can enable the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

An embodiment of data processing environment 100 includes client device 120, listening device 130, and server 140, all interconnected over network 110. In one embodiment, client device 120, listening device 130, and server 140 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120, listening device 130, and server 140, in accordance with embodiments of the present invention.

In an example, a smart speaker (e.g., listening device 130) receives audio from an operating environment of the smart speaker that includes a command. In this example, a server (e.g., server 140) communicates with the smart speaker to retrieve data about the command over the Internet (e.g., via network 110). Additionally, the server communicates with a laptop (e.g., client device 120) of a user to validate the command. In another embodiment, client device 120 communicates with listening device 130 through network 110. For example, prevention program 200 determines the proximity of a smart watch (e.g., client device 120) to a digital assistant (e.g., listening device 130) based on the amount of time taken by a signal of the digital assistant to reach the smart watch of a user via a personal access network (PAN) (e.g., network 110).

In various embodiments of the present invention, client device 120 may be a workstation, personal computer, digital video recorder (DVR), media player, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 3, in accordance with embodiments of the present invention.

Client device 120 includes user interface 122, application 124, and camera 126. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to access content. For example, application 124 is a web browser of a personal computer that a user can utilize to access streaming multimedia. In another embodiment, a user utilizes application 124 of client device 120 to access content stored in client device 120. For example, application 124 is a software program of a media player that a user can utilize to call up an audio program (e.g., podcast). In another embodiment, a user utilizes application 124 of client device 120 to register with prevention program 200 and define user preferences. For example, application 124 is a web browser of a mobile device that a user can utilize to set actions and notification settings for defined actions in response to prevention program 200 identifying an inconsistency.

Camera 126 is a video camera directly or indirectly connected to a device, a network, or a device connected to a network. In an example embodiment, camera 126 streams video of an area where a user or a smart speaker (e.g., listening device 130) is present. In one embodiment, camera 126 captures a location of a user with respect to a listening device 130. For example, a smart camera captures an operating environment of a smart speaker and a user physically present in the operating environment of the smart speaker. In another example, a front facing camera of a laptop or smartphone (e.g., client device 120) captures the presence of a user in proximity to a digital assistant (e.g., listening device 130).

In various embodiments of the present invention, listening device 130 may be a smart speaker, digital assistant, or any other device capable of executing computer readable program instructions, in accordance with embodiments of the present invention. Listening device 130 includes speakers, a processor, microphone 132, beamforming module 134, and vocal confirmation module 136. In various embodiments of the present invention, a user utilizes listening device 130 to play audio, receive commands, perform task, communicate with other IoT-enabled devices, and communicate with other users.

In one embodiment, listening device 130 receives a command and performs a task that corresponds to the command. For example, a digital assistant receives audio (e.g., ultrasound encoded message, hidden message, etc.) that includes a command and the digital assistant executes the task that corresponds to the received command. In another embodiment, listening device 130 communicates with client device 120 to request approval to perform a task associated with a command of a user. For example, a digital assistant receives a hidden message (e.g., a command) within audio of operating environment of the digital assistant. In this example, the digital assistant sends a text message to a smart watch of a user to request validation of the hidden message before performing a task that corresponds to the hidden message.

Microphone 132 can be two or more transducers that convert sound into an electrical signal, which have a fixed physical relationship in space between the two or more transducers (i.e., an array of microphones). In various embodiments microphone 132 can be made up of omnidirectional microphones, which receive sound from multiple directions where the electrical signals of the omnidirectional microphones include information utilized to determine a direction of arrival of the electrical signals received by microphone 132. Generally, a microphone array is any number of microphones operating in tandem that may utilized to extract audio signals from ambient noise. In an example embodiment, listening device 130 utilizes microphone 132 to receive a command from an operating environment of listening device 130. In another example embodiment, the microphone array may by in a geographical arrangement (e.g., linear, circular, planar, cylindrical, etc.).

Beamforming module 134 is a client-side subprogram of prevention program 200 that processes signals of the individual microphone elements of microphone 132. For example, beamforming module 134 can be a beamforming transceiver device, operating as a component of listening device 130. In various embodiments beamforming module 134 utilizes beamforming techniques (e.g., delay and sum, time of arrival (ToA), conventional (Bartlett) beamformer, spectrum-based beamforming, adaptive, parametric, etc.) to determine the direction and distance of a source of a voice command in relation to listening device 130. Generally, beamforming improves noise reduction and echo cancellation capabilities of a listening device by aligning the source of audio with the utilization of microphones in the embedded sensor array.

In an example embodiment, listening device 130 detects a trigger word (e.g., wake-up command) in the operating environment of listening device 130 and prevention program 200 initiates beamforming module 134 to receive a command that follows the trigger word. Additionally, beamforming module 134 receives multiple signals of the array of microphone 132 and utilizes delay and sum techniques to determine the direction and distance of the source of the trigger word in relation to listening device 130. Furthermore, beamforming module 134 may use parametric beamforming techniques along with spatial properties of microphone 132 (e.g., sensor array) estimate the source distance and direction in relation to listening device 130.

Vocal confirmation module 136 is a subprogram of prevention program 200 that interfaces with co-located and registered IoT devices that prevention program 200 utilizes to determine whether a command of listening device 130 originated from a valid source (i.e., an authorized user). Generally, a valid source is devoid of an inconsistency as to origin location source, authorization, and/or context, which may be confirmed through corroborating data of co-located and registered IoT devices. In one embodiment, a user utilizes client device 120 to authorize prevention program 200 to access data of client device 120. For example, prevention program 200 receives an affirmative reply in response to an authorization prompt to access a camera and network data of client device 120. In another embodiment, prevention program 200 initiates vocal confirmation module 136 to collect data of client device 120. For example, prevention program 200 prompts vocal confirmation module 136 to access camera 126, audio and video data, and personal access networks (PAN) connections of client device 120. In this example, prevention program 200 utilizes the collected data to determine whether client device 120 is in proximity to listening device 130. Furthermore, multiple instances of client device 120 can be co-located (e.g., within the operating environment) with listening device 130.

In another embodiment, vocal confirmation module 136 accesses client device 120 and listening device 130 to determine whether a command originated from a valid source. For example, vocal confirmation module 136 determines whether IoT devices and person(s) are co-located (i.e., within proximity) with a digital assistant. In this example, vocal confirmation module 136 collects information about the IoT devices and person(s) that prevention program 200 utilizes to determine whether the command is legitimate based on consistency between data of the command and data of the IoT devices. In another example, vocal confirmation module 136 can use video data camera 126 of client device 120 (e.g., a smart phone, smart camera, laptop, etc.) to determine visually whether a person is co-located in the operating environment of listening device 130.

In another scenario, vocal confirmation module 136 can use data of signals sent and/or received from IoT devices (e.g., via a PAN or via ultrasound) to determine whether a person or IoT devices are proximate to listening device 130. In yet another example, vocal confirmation module 136 can use data of content present on an IoT device (e.g., smart television) to determine a general topic of the content (e.g., audio, video, multimedia, etc.). In this example, vocal confirmation module 136 may utilize natural language processing (NLP) techniques to parse and derive a topic from metadata (e.g., descriptive, structural, etc.) of the content.

In various embodiments of the present invention, server 140 may be a desktop computer, a computer server, or any other computer systems, known in the art. In certain embodiments, server 140 represents computer systems utilizing clustered computers and components (e.g., database server computers, application server computers, etc.), which act as a single pool of seamless resources when accessed by elements of data processing environment 100. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 includes storage device 142 and prevention program 200. Storage device 142 can be implemented with any type of storage device, for example, persistent storage 305, which is capable of storing data that may be accessed and utilized by server 140, client device 120, and listening device 130, such as a database server, a hard disk drive, or a flash memory. In one embodiment storage device 142 can represent multiple storage devices within server 140. In various embodiments of the present invention storage device 142 stores a plurality of information, such as data of beamforming module 134 and vocal confirmation module 136. In another embodiment, data processing environment 100 can include additional servers (not shown) that host additional information that accessible via network 110.

Prevention program 200 can prevent adversarial audio attacks on listening devices utilizing integration of beamforming techniques and IoT devices to detect and isolate inconsistencies. Generally, an inconsistency is a variance in data of an audio command and collected data of IoT devices that indicative of a false pretense. In one embodiment, prevention program 200 identifies inconsistencies (e.g., location, authorization, contextual, etc.) between data (e.g., position, source, etc.) of a command listening device 130 receives and data of client device 120. For example, a user is in a room west of listening device 130 listening to music, while wearing client device 120. In this example, an unauthorized person to the south of listening device 130 plays an ultrasound encoded with a voice instruction (e.g., a command), which listening device 130 receives to the south. Additionally, prevention program 200 utilizes beamforming module 134 to determine a source direction of the voice instruction and utilizes data (e.g., PAN signal, GPS, etc.) of client device 120 to determine that the source of the voice instruction is inconsistent with the location of the user.

In another embodiment, prevention program 200 assigns a score and a confidence level to an identified inconsistency. For example, prevention program 200 identifies a location inconsistency when a voice instruction is determined (via beamforming) to have originated from Location A, which is fifteen (15) feet north of listening device 130. Additionally, prevention program 200 utilizes GPS modules of a smart watch and smart phone of a user to determine a current location (e.g., Location B) of the user, which is fifteen (15) feet south of listening device 130. In this example, prevention program 200 determines a degree of the location inconsistency (e.g., score, integer, etc.) of ninety (90) on a scale of zero (0) to one hundred (100), which may indicate a high score due to the location inconsistency having a large disparity in position relative to listening device 130 between Location A and Location B. Furthermore, prevention program 200 determines a degree of strength of information used to determine the inconsistency (e.g., confidence level, integer, etc.) of ninety (90) on a scale of zero (0) to one hundred (100), which may indicate a high score due to prevention program 200 utilizing GPS modules of the smart watch and phone of the user to verify the current location (e.g., Location B) of the user.

In another example, prevention program 200 identifies a contextual inconsistency in response to determining that a topic of a second voice instruction (e.g., Send a text.) does not relate to a topic of a first voice instruction (e.g., What is the weather forecast?) received by listening device 130 within a subsequent defined time period. Additionally, prevention program 200 utilizes a data of smart television (e.g., client device 120) to determine that a weather report is broadcasting currently (i.e., possible source of the first voice instruction) and a camera (e.g., camera 126) to determine that a person is currently present in the operating environment of listening device 130 (i.e., possible source of the second voice instruction). In this example, prevention program 200 determines a degree of the inconsistency (e.g., score, integer, etc.) of twenty (20) on a scale of zero (0) to one hundred (100), which may indicate a low score due to the contextual inconsistency indicating a lesser probability of malicious behavior (i.e., there are multiple justifiable explanations for the inconsistency). Furthermore, prevention program 200 determines a degree of strength of information used to determine the inconsistency (e.g., confidence level, integer, etc.) of twenty (20) on a scale of zero (0) to one hundred (100), which may indicate a low score due to a less definitive means (i.e., unlike GPS) of identifying the contextual inconsistency.

In another embodiment, prevention program 200 determines a rank of an identified inconsistency using an assigned score and confidence level. For example, prevention program 200 compares values (e.g., score, confidence level, etc.) between the location inconsistency and the contextual inconsistency and assigns a rank to the inconsistencies. In this example, prevention program 200 determines that a score and confidence level of the location inconsistency (e.g., 90 and 90 respectively) are higher than a score and confidence level of the contextual inconsistency (e.g., 20 and 20 respectively) and ranks the location inconsistency higher than the contextual inconsistency.

In yet another embodiment, prevention program 200 executes a defined action for an identified inconsistency that is equal to or above a defined threshold. For example, prevention program 200 compares a score, rank, and/or confidence level to a system-defined threshold level to determine whether to ignore a voice instruction (e.g., command), generate an audible notification to a co-located authorized user, or send a notification to an authorized user requesting permission to complete the action. In another example, prevention program 200 determines an inconsistency of a voice instruction based on whether a score, rank, and/or confidence level is below a system-defined threshold level and discards or allows the voice instruction to be performed by listening device 130. In yet another example, prevention program 200 determines which defined actions to perform based on whether an authorized user is physically present in the operating environment of the listening device 130 and/or data of client device 120.

Figure 2:
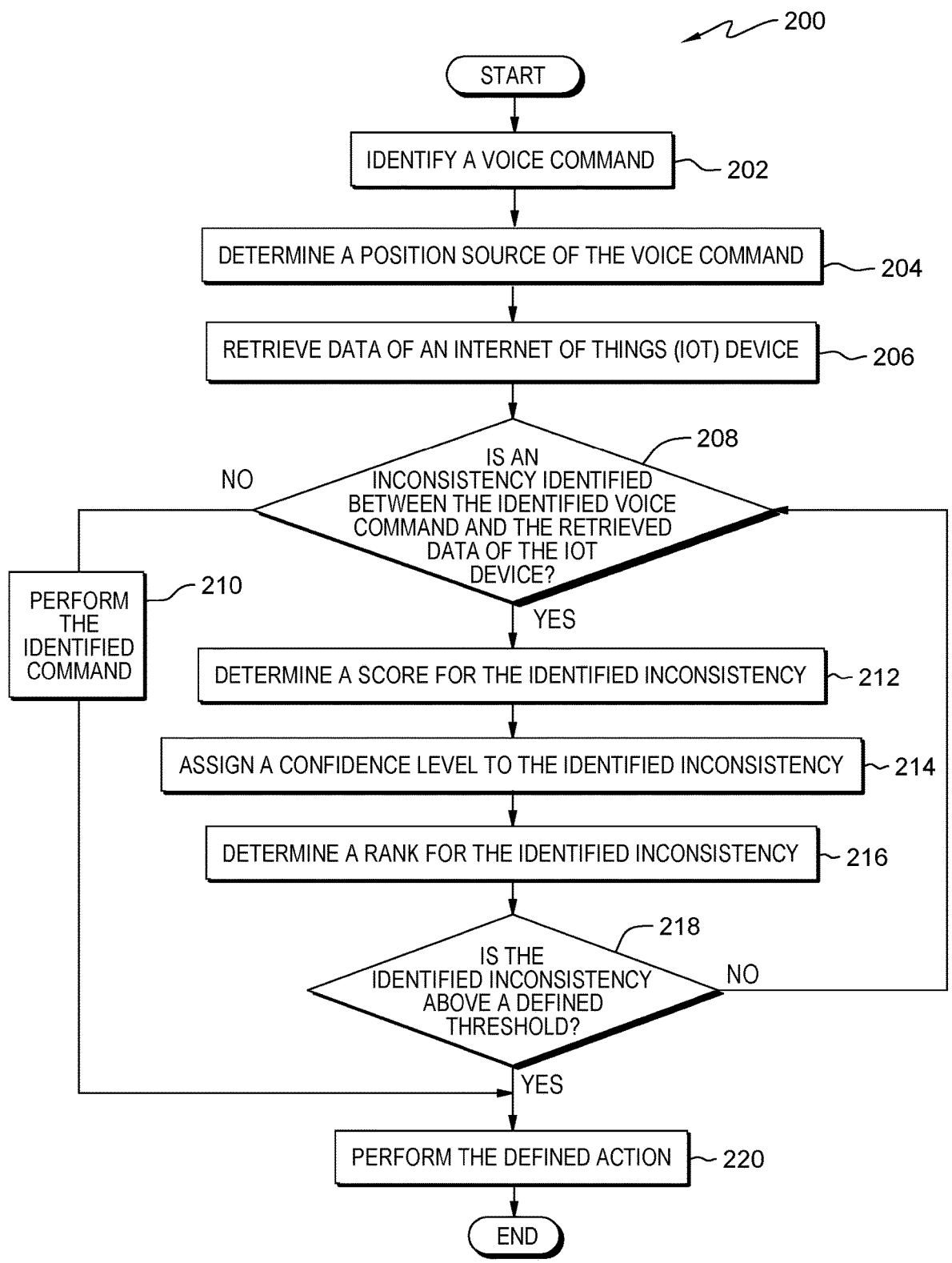
FIG. 2 is a flowchart depicting operational steps of a program for preventing adversarial audio attacks through detecting and isolating inconsistencies utilizing beamforming techniques and IoT devices, in accordance with embodiments of the present invention.

FIG. 2 is a flowchart depicting operational steps of prevention program 200, a program for preventing adversarial audio attacks through detecting and isolating inconsistencies utilizing beamforming techniques and IoT devices, in accordance with embodiments of the present invention. In one embodiment, prevention program 200 initiates in response to listening device 130 detecting a wake-up command. For example, prevention program 200 initiates when a smart speaker receives a voice instruction that requires the smart speaker to activate and receive further voice instructions. In another embodiment, prevention program 200 is continuously monitoring listening device 130. For example, prevention program 200 is constantly monitoring activities of a smart speaker after a user links the smart speaker with an account of a server that includes prevention program 200.

In step 202, prevention program 200 identifies a voice command. In one embodiment, prevention program 200 utilizes microphone 132 to detect a trigger word in an operating environment of listening device 130 and initiates beamforming module 134 to detect a voice command subsequent to the trigger word. For example, a trigger word can be one or more words that is a directive to a computer program to perform a specific task (e.g., initiate, run, wake-up, etc.). In another example, prevention program 200 uses beamforming module 134 to improve the quality of sound of audio data in an operating of a smart speaker, reduce noise, and echo by aligning a microphone array with a source of the audio data. In this example, prevention program 200 identifies a verbal instruction (e.g., send fifty dollars to John) encoded in the audio data (i.e., hidden message) received by the smart speaker subsequent to receiving a wake-up command (e.g., trigger word).

In step 204, prevention program 200 determines a position source of the voice command. In various embodiments of the present invention, prevention program 200 determines a position or direction of a source of a voice command in relation listening device 130. In one embodiment, prevention program 200 utilizes beamforming module 134 to determine a position of the voice command with respect to listening device 130. For example, a microphone array of a smart speaker receives an audio signal (e.g., ultrasound, modified waveform, etc.) that includes a verbal instruction (e.g., send fifty dollars to John). Prevention program 200 can utilize beamforming techniques (e.g., delay and sum, conventional (Bartlett) beamformer, adaptive, parametric, etc.) to determine that a direction of arrival (DOA) of the audio signal originates to the north of the smart speaker. In this example, prevention program 200 can utilize data of beamforming module 134 to determine a sensitivity pattern of the microphone array that indicates a direction of a source of the audio signal.

In another embodiment, prevention program 200 utilizes beamforming module 134 to determine a proximate distance of the voice command with respect to listening device 130. For example, prevention program 200 uses the angles of audio waves received by each omnidirectional microphone of the microphone array from a beamforming transceiver device and triangulates the source distance. In this example, prevention program 200 determines that the verbal instruction (e.g., send fifty dollars to John) originates fifteen (15) feet to the north of the smart speaker.

In step 206, prevention program 200 retrieves data of an internet of things (IoT) device. In one embodiment, prevention program 200 utilizes vocal confirmation module 136 to request data of client device 120, which prevention program 200 utilizes to identify an inconsistency. For example, prevention program 200 can determine a proximate distance between a smart watch and a smart speaker based on an amount of time a signal (e.g., PAN communication, ultrasound, etc.) of the smart speaker takes to arrive at the smart watch. In this example, prevention program 200 uses the time-of-flight (ToF) of the signal of the smart speaker to determine whether the smart watch is within a defined proximity of the smart speaker. Additionally, prevention program 200 utilizes a beamforming transceiver device (e.g., beamforming module 134) to determine a direction of a response signal in relation to the smart speaker. Furthermore, prevention program 200 can determine if a user of the device is authorized to issue verbal commands to the smart speaker based on registration information (e.g., a user pre-registering a device).

In another example, prevention program 200 can determine whether a person is physically located in an operating environment of a smart speaker and whether the person is an authorized to issue verbal commands using video data of a front and/or rear-facing camera of a mobile device. In this example, prevention program 200 can use facial recognition techniques to identify an authorized user based on data of provided when registering with prevention program 200. In another example, prevention program 200 can utilize video data of a smart video camera to determine a visual viewpoint of a person that is physically located in an operating environment of a smart speaker and the smart speaker. In yet another example, prevention program 200 can utilize audio data, video data and/or metadata (e.g., descriptive, structural, etc.) of a streaming device (e.g., smart television, tablet, etc.) to determine a general topic the data of the streaming device.

In decision step 208, prevention program 200 determines whether an inconsistency is identified between the identified voice command and the retrieved data of the IoT device. In various embodiments of the present invention prevention program 200 identifies variations (e.g., location inconsistency, authorization inconsistency, contextual inconsistency, etc.) between a voice command (of step 202 and step 204) and data of IoT devices physically present in an operating environment (of step 206) of a digital assistant device that may indicate an adversarial audio attack.

In one embodiment, prevention program 200 utilizes beamforming module 134 and vocal confirmation module 136 to identify a location inconsistency of a voice command listening device 130 receives. For example, a user is listening to music on a smart speaker and the smart speaker receives a message (e.g., send fifty dollars to John) encoded in an ultrasound, which is broadcast at a frequency that the user cannot hear. Additionally, prevention program 200 uses a beamforming transceiver to determine that the voice instruction originates fifteen (15) feet to the north of the smart speaker and determines that the user is fifteen (15) feet to the south of the smart speaker based on the ToF of a signal sent to a smart watch and phone of the user from the beamforming transceiver. In this example, prevention program determines that a location inconsistency exists between a source location of the voice command and a current location of the user.

In another embodiment, prevention program 200 utilizes beamforming module 134 and vocal confirmation module 136 to identify a contextual inconsistency of a voice command that listening device 130 receives. For example, a user is watching a video on a smart television (e.g., client device 120) in the living room and the video contains audio that has been modified with CTC Loss and gradient descent to contain a hidden message (e.g., Hey send a text message to my boss saying I quit), which is indistinguishable from the audio of the video to the user. Additionally, a smart speaker (e.g., listening device 130) in the living room receives the hidden message and prevention program 200 uses a beamforming transceiver (e.g., beamforming module 134) to determine that the hidden message (e.g., voice command) originates from the smart television. Furthermore, prevention program 200 uses data of the smart television to determine that the video relates to a sporting event and video data of a web camera (e.g., camera 126) to determine a location of the user (e.g., a user is sitting on a sofa in the living room). In this example, prevention program 200 determines that a contextual inconsistency exist between the topic of the video and the topic of the hidden message of the video, as well as the source of the hidden message relative to the location of the user.

In another embodiment, prevention program 200 utilizes beamforming module 134 and vocal confirmation module 136 to identify an authorization inconsistency of a voice command that listening device 130 receives. For example, a person illegally gains access to a smart device (e.g., client device 120) of a user and adds a program that has the capability to learn a speech pattern of the user and use the speech pattern of the user to give a verbal instruction. Additionally, prevention program 200 uses a beamforming transceiver to determine a source of the verbal instruction and uses a vocal confirmation module to determine whether the smart device is authorized to give verbal instructions. In this example, prevention program 200 determines that an authorization inconsistency exist due to receiving commands from a device that is not registered and/or not authorized to give verbal commands.

If prevention program 200 determines that an inconsistency does not exist amongst information of the identified voice command and the retrieved data of the IoT device (decision step 208, "NO" branch), then prevention program 200 allows listening device 130 to perform the identified voice command (step 210). For example, if prevention program 200 determines a source location of a voice instruction originates from a current location of a user (i.e., prevention program 200 does not identify a location inconsistency), then prevention program 200 allows a smart speaker to perform a task that corresponds to the voice instruction. In another example, if prevention program 200 determines a smart speaker receives a voice pattern of an authorized user and that the authorized user is physically present at a source location of the voice pattern (i.e., prevention program 200 does not identify an authorization inconsistency), then prevention program 200 allows a smart speaker to perform a task that corresponds to a voice command of the voice pattern. In yet another example, if prevention program 200 determines a smart speaker receives a voice pattern of a registered user where only the registered user is present in the operating environment of the smart speaker (i.e., prevention program 200 does not identify a contextual inconsistency), then prevention program 200 allows a smart speaker to perform a task that corresponds to a voice command of the voice pattern.

In step 210, prevention program 200 performs the identified command. In one embodiment, prevention program 200 allows listening device 130 to perform the identified command (e.g., the identified voice command of step 202). For example, prevention program 200 authorizes a smart speaker to perform a task that corresponds to the smart speaker.

In step 212, prevention program 200 determines a score for the identified inconsistency. More specifically, in response to prevention program 200 determining that an inconsistency exist amongst information of the identified voice command and the retrieved data of the IoT device (decision step 208, "YES" branch), prevention program 200 determines a score for the identified inconsistency that listening device 130 receives (step 212).

For example, prevention program 200 determines a source location (e.g., Location A) of a voice instruction originates fifteen (15) feet to the north of a smart speaker and a current location (e.g., Location B) of a user is fifteen (15) feet to the south of the smart speaker (i.e., prevention program 200 identifies a location inconsistency). Prevention program 200 can then determine a score of the location inconsistency based on an angle (e.g., acute, right, obtuse, straight, etc.) between a vector representation of Location A and Location B, with the smart speaker as the origin. In this example, prevention program 200 may assign a score ninety (90) on a scale of zero (0) to one hundred (100) to the identified location inconsistency that is directly proportional to the magnitude of the angle (e.g., straight, 180 degrees).

In another example, prevention program 200 determines a smart speaker receives a voice pattern of an authorized user and that the authorized user is not physically present at a source location of the voice pattern (i.e., prevention program 200 identifies an authorization inconsistency). Prevention program 200 can then determine a score of the identified authorization inconsistency based on a registration status of an IoT device from which the voice pattern originates. In this example, prevention program 200 may assign a score to the identified authorization inconsistency based on registration status and/or granted permissions of the IoT device.

In yet another example, prevention program 200 determines a smart speaker receives a voice pattern of a registered user where only a non-registered user is present in the operating environment of the smart speaker (i.e., prevention program 200 identifies a contextual inconsistency). Prevention program 200 can then determine a score of the identified contextual inconsistency based on conditions that form the identified contextual inconsistency. In this example, prevention program 200 can assign a score of twenty (20) on a scale of zero (0) to one hundred (100) to the identified contextual inconsistency based on identifiable tones in the voice pattern of the verbal command.

In step 214, prevention program 200 assigns a confidence level to the identified inconsistency. In one embodiment, prevention program 200 identifies sources of information utilized to derive a score of the identified inconsistency and determines a confidence level for the information. For example, prevention program 200 identifies that the location of the user is derived using GPS data of the smart watch and phone (e.g., client device 120) of the user and the location of the source of the verbal instruction derived from data of the beamforming transceiver device. In this example, prevention program 200 can assign a confidence level of ninety (90) on a scale of zero (0) to one hundred (100) due to the definitive nature of the source of the information (e.g., GPS module).

In another example, prevention program 200 identifies that the context (e.g., classification of the tone of the voice pattern, classification of the person, topics of audio, etc.) derives from less definitive sources. In this example, prevention program 200 can assign a confidence level of twenty (20) on a scale of zero (0) to one hundred (100) due to the less definitive nature of the source of the information used to identify the contextual inconsistency.

In step 216, prevention program 200 determines a rank for the identified inconsistency. In one embodiment, prevention program 200 ranks an identified inconsistency based on a determined score (from step 212) and an assigned confidence level (from step 214). For example, prevention program 200 ranks a first identified inconsistency higher than a second identified inconsistency based on the first identified inconsistency having a higher score and confidence level.

In an example embodiment, prevention program 200 compares the score of the identified location inconsistency (e.g., 90) to the score of the identified contextual inconsistency (e.g., 20) and the confidence level of the identified location inconsistency (e.g., 90) to the confidence level of the identified contextual inconsistency (e.g., 20). Prevention program 200 can then determine a ranking of the identified location inconsistency that is higher than the identified contextual inconsistency based on the comparison of factors (e.g., score, confidence level, etc.). In another embodiment, prevention program 200 assigns a value (e.g., integer) to an identified inconsistency based on an assigned rank. For example, prevention program 200 assigns the identified location inconsistency a value of twenty (20) and assigns the identified contextual inconsistency a value of ten (10).

In decision step 218, prevention program 200 determines whether the identified inconsistency is above a defined threshold. In various embodiments of the present invention a threshold is defined by the system utilizing feedback of the user. In one embodiment, prevention program 200 combines values of an identified inconsistency (e.g., score, confidence level, rank, etc.) and determines whether the combined value of the identified inconsistency above a defined threshold. For example, prevention program 200 determines a total value for the identified inconsistency and determines whether the total value of the identified inconsistency exceeds a defined threshold.

If prevention program 200 determines that the identified inconsistency does not exceed a defined threshold (decision step 218, "NO" branch), then prevention program 200 returns to step 210 and allows listening device 130 to perform the identified voice command (step 210). For example, if prevention program 200 determines that the total value of the identified contextual inconsistency (i.e., 50) does not exceed a defined threshold (e.g., 150), then prevention program 200 allows a smart speaker to perform a task that corresponds to a voice command of the voice pattern.

In step 220, prevention program 200 performs the defined action. In various embodiments of the present invention prevention program 200 may determine which defined action may performed based on preferences or availability of a user. More specifically, in response to prevention program 200 determining that the identified inconsistency does exceed a defined threshold (decision step 218, "YES" branch), prevention program 200 performs a defined action (step 220). For example, if prevention program 200 determines that the total value of the identified location inconsistency (i.e., 200) does exceed a defined threshold (e.g., 150), then prevention program 200 implements a defined action (e.g., ignore, issue an alert, send a notification, etc.) for the voice command. In this example, when a user is not within a proximity to a smart speaker (i.e., prevention program 200 identifies a location inconsistency), determines a defined action to perform. Additionally, prevention program 200 transmits a notification to a mobile device or smart watch of a user due to prevention program 200 determining that issuing an audible alert would be ineffective based on the identified location inconsistency.

In one embodiment, prevention program 200 ignores the voice command received by listening device 130 (in step 202). For example, prevention program 200 prohibits performance of the task that corresponds to a verbal instruction a smart speaker receives. In another embodiment, prevention program 200 issues an audible alert to the user via listening device 130. For example, prevention program 200 utilizes a smart speaker to communicate a verbal warning (e.g., Are you sure you want to send that text message?) to a co-located authorized user. In this example, prevention program 200 prohibits performance of the task that corresponds to a verbal instruction until the co-located authorized user authorizes performance. In yet another embodiment, prevention program 200 generates a notification to client device 120. For example, prevention program 200 transmits a message to pre-registered smart phone of a co-located user requesting permission to perform the task corresponding to a verbal instruction received by the smart speaker. In this example, the permission request may be a multi-factor authentication request (e.g., two-factor authentication, two-step verification, etc.).

Figure 3:
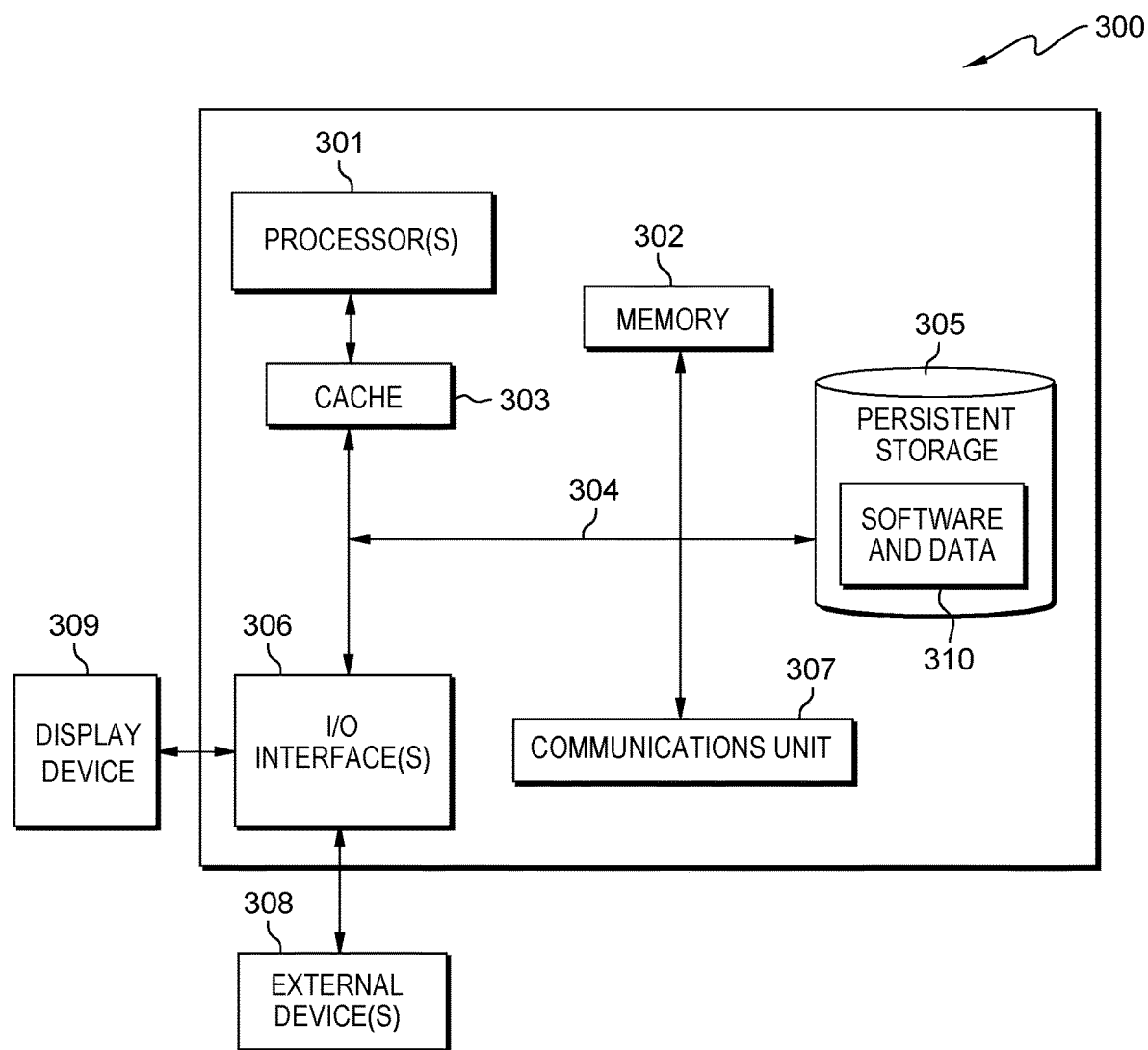
FIG. 3 depicts a block diagram of components of a computing system representative of the client device, listening device, and server of FIG. 1, in accordance with an embodiment of the present invention.

FIG. 3 depicts computer system 300, which is representative of client device 120, listening device 130, and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of application 124 and camera 126. With respect to listening device 130, software and data 310 includes data of beamforming module 134 and vocal confirmation module 136. With respect to server 140, software and data 310 includes prevention program 200 and data of storage device 142.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, a microphone, a camera, a sensor, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more processors, an audio command received by a listening device;
   determining, by one or more processors, a source location of the audio command utilizing a sensor array of the listening device;
   determining, by one or more processors, a location of a user in relation to the listening device based on data of an Internet of Things (IoT) device;
   determining, by one or more processors, an inconsistency between the determined source location and the determined location of the user based at least in part on data of the sensor array and data of the IoT device; and
   determining, by one or more processors, a rank of the inconsistency based at least in part on factors of the inconsistency, wherein the factors include a score value and confidence level value.

2. The method of claim 1, further comprising:
   verifying, by one or more processors, authorization of a device located at the determined source location of the audio command, wherein authorization is a set of permissions granted during registration of the device; and
   determining, by one or more processors, that the inconsistency indicates that the audio command includes an audio adversarial attack.

3. The method of claim 1, further comprising:
   performing, by one or more processors, an action, wherein the action is selected from the group consisting of: denying the identified audio command, requesting confirmation, and generating a notification.

4. The method of claim 1, wherein determining the source location of the audio command utilizing the sensor array of the listening device, further comprises:
   receiving, by one or more processors, an audio signal that includes the audio command;
   determining, by one or more processors, a directivity of the sensor array that receives the audio signal utilizing spatial filtering; and
   verifying, by one or more processors, authorization of a device located at the determined source location, wherein authorization is a set of permissions granted during registration of the device.

5. The method of claim 1, wherein identifying the inconsistency between the determined source location and the determined location of the user based at least in part on data of the sensor array and data of the IoT device, further comprises:
   comparing, by one or more processors, data of the sensor array to data of the IoT device, wherein data of the sensor array includes the determined location source, topic of the audio command, and voice pattern of the audio command, and wherein the data of the IoT device includes position data, video data, and metadata;
   identifying, by one or more processors, a variation in data of the sensor array and the data of the IoT device; and
   determining, by one or more processors, that the identified variation is selected from a group consisting of: a location variation, a context variation, and an authorization variation.

6. The method of claim 1, further comprises:
   assigning, by one or more processors, the score value to the inconsistency, wherein the score value is based on a degree of variation in the inconsistency;
   assigning, by one or more processors, the confidence level value to the inconsistency wherein the confidence level value is based on a degree of strength of information used to identify the inconsistency; and
   ranking, by one or more processors, the inconsistency, wherein ranking includes determining a positional order and corresponding rank value based on the score value and the confidence level value of the inconsistency.

7. The method of claim 6, wherein determining an inconsistency between the determined source location and the determined location of the user based at least in part on data of the sensor array and data of the IoT device, further comprises:
   determining, by one or more processors, that a total value of the inconsistency exceeds a defined threshold, wherein the total value is a sum of a score, confidence level, and rank values.

8. A computer program product comprising:
   one or more computer readable storage media and program instructions stored on the one or more computer readable storage media, the program instructions comprising:
   program instructions to identify an audio command received by a listening device;
   program instructions to determine a source location of the audio command utilizing a sensor array of the listening device;
   program instructions to determine a location of a user in relation to the listening device based on data of an Internet of Things (IoT) device;
   program instructions to determine an inconsistency between the determined source location and the determined location of the user based at least in part on data of the sensor array and data of the IoT device; and
   program instructions to determine a rank of the inconsistency based at least in part on factors of the inconsistency, wherein the factors include a score value and confidence level value.

9. The computer program product of claim 8, further comprising program instructions, stored on the one or more computer readable storage media, to:
   verify authorization of a device located at the determined source location of the audio command, wherein authorization is a set of permissions granted during registration of the device; and
   determine that the inconsistency indicates that the audio command includes an audio adversarial attack.

10. The computer program product of claim 8, further comprising program instructions, stored on the one or more computer readable storage media, to:
    perform an action, wherein the action is selected from the group consisting of: denying the identified audio command, requesting confirmation, and generating a notification.

11. The computer program product of claim 8, wherein program instructions to determine the source location of the audio command utilizing a sensor array of the listening device, further comprise program instructions to:
  receive an audio signal that includes the audio command;
  determine a directivity of the sensor array that receives the audio signal utilizing spatial filtering; and
  verify authorization of a device located at the determined source location, wherein authorization is a set of permissions granted during registration of the device.

12. The computer program product of claim 8, wherein program instructions to identify the inconsistency between the determined source location and the determined location of the user based at least in part on data of the sensor array and data of the IoT device, further comprise program instructions to:
  compare data of the sensor array to data of the IoT device, wherein data of the sensor array includes the determined location source, topic of the audio command, and voice pattern of the audio command, and wherein the data of the IoT device includes position data, video data, and metadata;
  identifying a variation in data of the sensor array and the data of the IoT device; and
  determine that the identified variation is selected from a group consisting of: a location variation, a context variation, and an authorization variation.

13. The computer program product of claim 8, further comprising program instructions, stored on the one or more computer readable storage media, to:
  assign the score value to the inconsistency, wherein the score value is based on a degree of variation in the inconsistency;
  assign the confidence level value to the inconsistency wherein the confidence level value is based on a degree of strength of the information used to identify the inconsistency; and
  rank the inconsistency, wherein ranking includes determining a positional order and corresponding rank value based on the score value and the confidence level value of the inconsistency.

14. The computer program product of claim 13, wherein program instructions to identify the inconsistency between the determined source location and the determined location of the user based at least in part on data of the sensor array and data of the IoT device, further comprise program instructions to:
  determining that a total value of the inconsistency exceeds a defined threshold, wherein a total value is a sum of a score, confidence level, and rank values.

15. A computer system comprising:
  one or more computer processors;
  one or more computer readable storage media; and
  program instructions stored on the computer readable storage media for execution by at least one of the one or more processors, the program instructions comprising:
  program instructions to identify an audio command received by a listening device;
  program instructions to determine a source location of the audio command utilizing a sensor array of the listening device;
  program instructions to determine a location of a user in relation to the listening device based on data of an Internet of Things (IoT) device;
  program instructions to determine an inconsistency between the determined source location and the determined location of the user based at least in part on data of the sensor array and data of the IoT device; and
  program instructions to determine a rank of the inconsistency based at least in part on factors of the inconsistency, wherein the factors include a score value and confidence level value.

16. The computer system of claim 15, further comprising program instructions, stored on the one or more computer readable storage media, to:
  verify authorization of a device located at the determined source location of the audio command, wherein authorization is a set of permissions granted during registration of the device; and
  determine that the inconsistency indicates that the audio command includes an audio adversarial attack.

17. The computer system of claim 15, further comprising program instructions, stored on the one or more computer readable storage media, to:
  perform an action, wherein the action is selected from the group consisting of: denying the identified audio command, requesting confirmation, and generating a notification.

18. The computer system of claim 15, wherein program instructions to determine the source location of the audio command utilizing a sensor array of the listening device, further comprise program instructions to:
  receive an audio signal that includes the audio command;
  determine a directivity of the sensor array that receives the audio signal utilizing spatial filtering; and
  verify authorization of a device located at the determined source location, wherein authorization is a set of permissions granted during registration of the device.

19. The computer system of claim 16, wherein program instructions to identify the inconsistency between the determined source location and the determined location of the user based at least in part on data of the sensor array and data of the IoT device, further comprise program instructions to:
  compare data of the sensor array to data of the IoT device, wherein data of the sensor array includes the determined location source, topic of the audio command, and voice pattern of the audio command, and wherein the data of the IoT device includes position data, video data, and metadata;
  identifying a variation in data of the sensor array and the data of the IoT device; and
  determine that the identified variation is selected from a group consisting of: a location variation, a context variation, and an authorization variation.

20. The computer system of claim 15, further comprising program instructions, stored on the one or more computer readable storage media, to:
  assign the score value to the inconsistency, wherein the score value is based on a degree of variation in the inconsistency;
  assign the confidence level value to the inconsistency wherein the confidence level value is based on a degree of strength of the information used to identify the inconsistency; and
  rank the inconsistency, wherein ranking includes determining a positional order and corresponding rank value based on the score value and the confidence level value of the inconsistency.

* * * * *